United States Patent
Lu et al.

(10) Patent No.: US 9,845,849 B2
(45) Date of Patent: Dec. 19, 2017

(54) ADJUSTABLE HANGING DEVICE

(71) Applicant: SYNCMOLD ENTERPRISE CORP., New Taipei (TW)

(72) Inventors: Der-Wei Lu, New Taipei (TW); Chung-Cheng Hu, New Taipei (TW); Ling-Yu Chu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 469 days.

(21) Appl. No.: 14/614,204

(22) Filed: Feb. 4, 2015

(65) Prior Publication Data

US 2016/0010794 A1  Jan. 14, 2016

(30) Foreign Application Priority Data

Jul. 10, 2014  (TW) .............................. 103212237 U

(51) Int. Cl.
| | |
|---|---|
| F16H 19/04 | (2006.01) |
| F16M 13/02 | (2006.01) |
| F16M 11/14 | (2006.01) |
| F16M 11/18 | (2006.01) |
| G03B 21/14 | (2006.01) |
| G03B 21/54 | (2006.01) |

(52) U.S. Cl.
CPC .............. *F16H 19/04* (2013.01); *F16M 11/14* (2013.01); *F16M 11/18* (2013.01); *F16M 13/027* (2013.01); *G03B 21/145* (2013.01); *G03B 21/54* (2013.01)

(58) Field of Classification Search
CPC .......... G03B 21/145; Y10T 403/32041; F16M 11/18; F16M 11/2057; F16M 13/02; F16M 13/022; F16M 13/027
See application file for complete search history.

(56) References Cited

U.S. PATENT DOCUMENTS

| | | | | |
|---|---|---|---|---|
| 1,386,025 | A  * | 8/1921 | Pittman .................. | F16M 11/10 248/183.4 |
| 6,334,599 | B1 * | 1/2002 | Jeong ..................... | F16M 11/08 248/186.2 |
| 7,497,412 | B2 * | 3/2009 | Dittmer .................. | F16M 11/12 248/222.11 |
| 8,757,564 | B2 | 6/2014 | Huang | |
| 2009/0294619 | A1 * | 12/2009 | David .................. | F16M 11/043 248/324 |
| 2011/0297809 | A1 * | 12/2011 | Bouissiere .......... | F16M 11/043 248/274.1 |

FOREIGN PATENT DOCUMENTS

| | | |
|---|---|---|
| CN | 102778809 A | 11/2012 |
| TW | 590834 B | 6/2004 |
| TW | M434423 U | 7/2012 |
| WO | WO2014/026391 A1 | 2/2014 |

* cited by examiner

Primary Examiner — Michael P Ferguson

(74) Attorney, Agent, or Firm — Muncy, Geissler, Olds & Lowe, P.C.

(57) ABSTRACT

An adjustable hanging device for securing an electronic device and being capable of angular adjustment is provided. One control screw is disposed for the operation along one dimension. When the adjustable hanging device is used for multi-dimensional angular adjustments, the control screws are disposed to extend to one operational side. Due to the mechanical integration and the compact design of the adjustable hanging device, the advantages of volume reduction and simpler manipulation at one operational side would be expectable.

11 Claims, 19 Drawing Sheets

ADJUSTABLE HANGING DEVICE

BACKGROUND OF THE INVENTION

1. Field of the Invention

The present invention relates to an adjustable hanging device and, more particularly, to a device for hanging an electronic device where the hanging angles are adjustable.

2. Description of Related Art

As technologies continue advancing, electronic devices such as displays, speakers, projectors and monitors have become common and adapted to fulfil various purposes and conditions in our daily lives. Such electronic devices usually need to be hung or attached while operating. They are generally placed on the ground with stands, attached to the wall with mounting structures, or hung on the ceiling with hanging devices. In many cases, suspending such electronic devices with hanging devices is deemed to be a favorable option for utilizing space effectively and avoiding blocking visions of viewers.

It may be assumed that an electronic device does not need to be moved frequently if it is hung on the ceiling. For example, a projector is often hung on the ceiling in a meeting room with a fixed projection screen. Speakers and video recorders are commonly hung in an auditorium. However, minor adjustments are still required although such electronic devices are generally fixed in positions. For example, a projector might require minor adjustments in leveling, height or angles.

Existing hanging devices already disclose concepts and structures that may be adjusted in at least a position or angle. For example, a hanging device may be moved or rotated in three dimensions using three controlling screw rods and relevant mechanisms. However, within known controlling mechanisms and adjusting structures, the controlling ends (i.e. operable ends of the screw rods) are usually disposed on different sides of a hanging device due to limitations in structural design.

The space where a hanging device is disposed is defined with X-axis, Y-axis and Z-axis, wherein X-axis and Y-axis are perpendicular to each other and define a horizontal plane, and Z-axis is perpendicular to X-axis and Y-axis. The controlling ends of an existing hanging device extend in different directions, such as having a first controlling screw rod on the left side of the hanging device to rotate the hanging device around Z-axis, having a second controlling screw rod on the front side of the hanging device to rotate the hanging device around Y-axis, and having a third controlling screw rod at the bottom of the hanging device to rotate the hanging device around X-axis, thus to prevent different controlling and adjusting mechanisms of respective dimensions from interfering one another.

It is not easy for an user or technician to operate an electronic device hung on the ceiling, and it is even more difficult and complicated when controlling ends are disposed in different positions on the hanging device.

Therefore, it is desirable to provide a hanging device for electronic devices that allows users to easily adjust its positions and angles with ease.

SUMMARY OF THE INVENTION

The object of the present invention is to provide a hanging device that is not only used to attach an electronic device firmly, but also adjustable in positions and angles with ease.

To achieve the object, the structural design of the present invention includes a controlling screw rod corresponding to the adjusting requirement in a dimension. In a preferred embodiment, independent adjustments in three dimensions may be achieved through three controlling screw rods.

Another object of the present invention is to allow users to operate on the same side and adjust angles of the hanging device in different dimensions without interference one another's mechanism. In other words, unique structural design of the present invention overcomes shortfalls of interference between mechanisms in prior art. Mechanisms of each dimension are skillfully integrated to allow users to operate all controlling screw rods on the same side. As a result, both the size and the space required for operating the hanging device of present invention are smaller.

In order to achieve these objects, the present invention provides an adjustable hanging device including a bearing base, a dome member and a first adjusting module. The dome member includes two first inner flat surfaces oppositely facing each other and a first inner cambered surface connecting the two first inner flat surfaces. The first adjusting module includes a first sliding member, a first gear, a first screw rod and a first adjusting column. The first sliding member has two second outer flat surfaces oppositely facing away from each other and a second outer cambered surface connecting the two second outer flat surfaces. When the first sliding member is fitted in the dome member, the second outer cambered surface corresponds to the first inner cambered surface, and the second outer flat surfaces correspond to the first inner surfaces. The first gear is disposed concentrically on the bearing base and the first sliding member. The first gear has two wings, each of the wings respectively has a first curved groove, and one of the first curved grooves has a plurality of teeth. Each of the curved grooves has a first end and a second end. A first radius of curvature, defined by a straight line between a center of the first gear and the first end, is smaller than a second radius of curvature, defined by a straight line between the center of the first gear and the second end. The first screw rod engages with the teeth of the first gear. The first adjusting column is connected to the first sliding member and elongates through the first curved groove. While the first gear is driven by the first screw rod to rotate around a center, the first adjusting column and the first gear are capable of moving relatively due to the first adjusting column being restricted within the first curved groove, and further the second outer cambered surface is capable of relatively sliding with respect to the first inner cambered surface due to the restriction between the first inner flat surfaces and the second outer flat surfaces, so as drive the first sliding member relatively sliding with respect to the bearing base.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
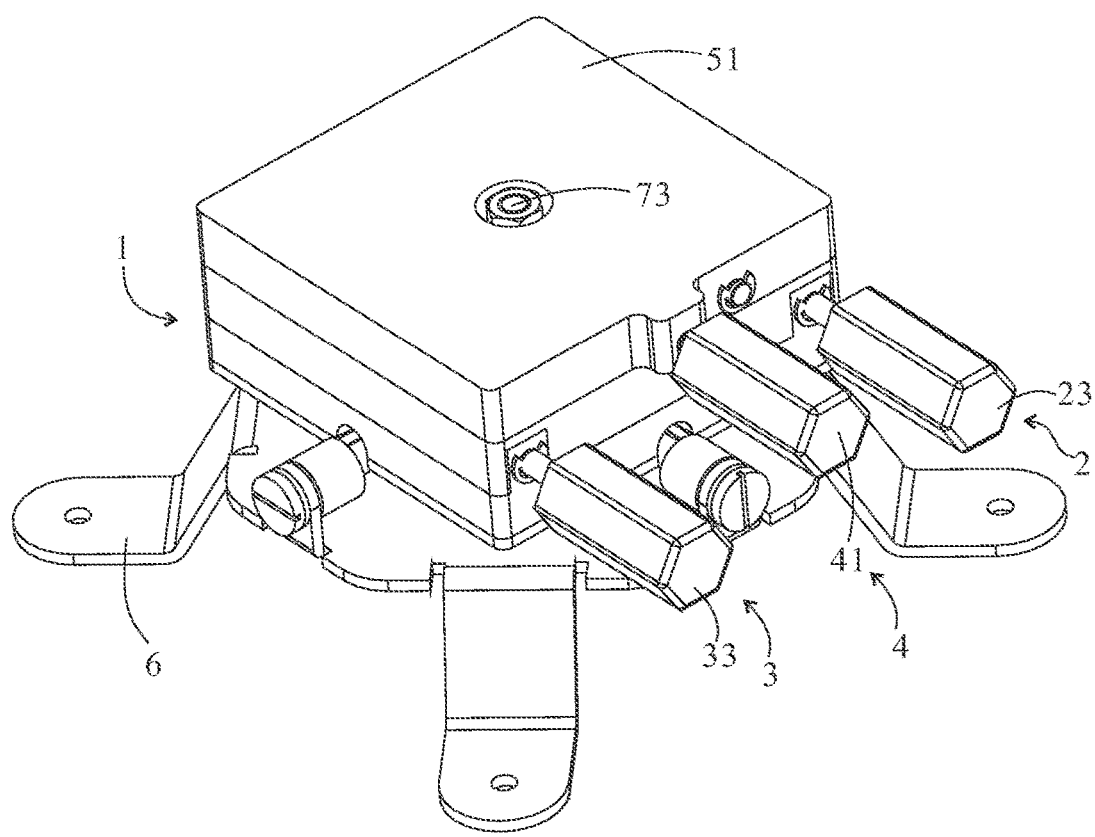
FIG. 1 is a perspective view of the adjustable hanging device of present invention.

With reference to FIG. 1, a perspective view of an adjustable hanging device of the present invention is shown. The adjustable hanging device comprises a bearing base 1, a first adjusting module 2, a second adjusting module 3, a third adjusting module 4 and a bracket 6. The bracket 6 is suitable to be attached to an electronic device such as a projector. Through relative movements of the first adjusting module 2, the second adjusting module 3, and the third adjusting module 4 in respect of the bearing base 1, the electronic device is also relatively adjusted to the bearing base 1. The electronic device may be adjusted in X-axis, Y-axis or Z-axis independently to achieve a best angle position.

Figure 2A:
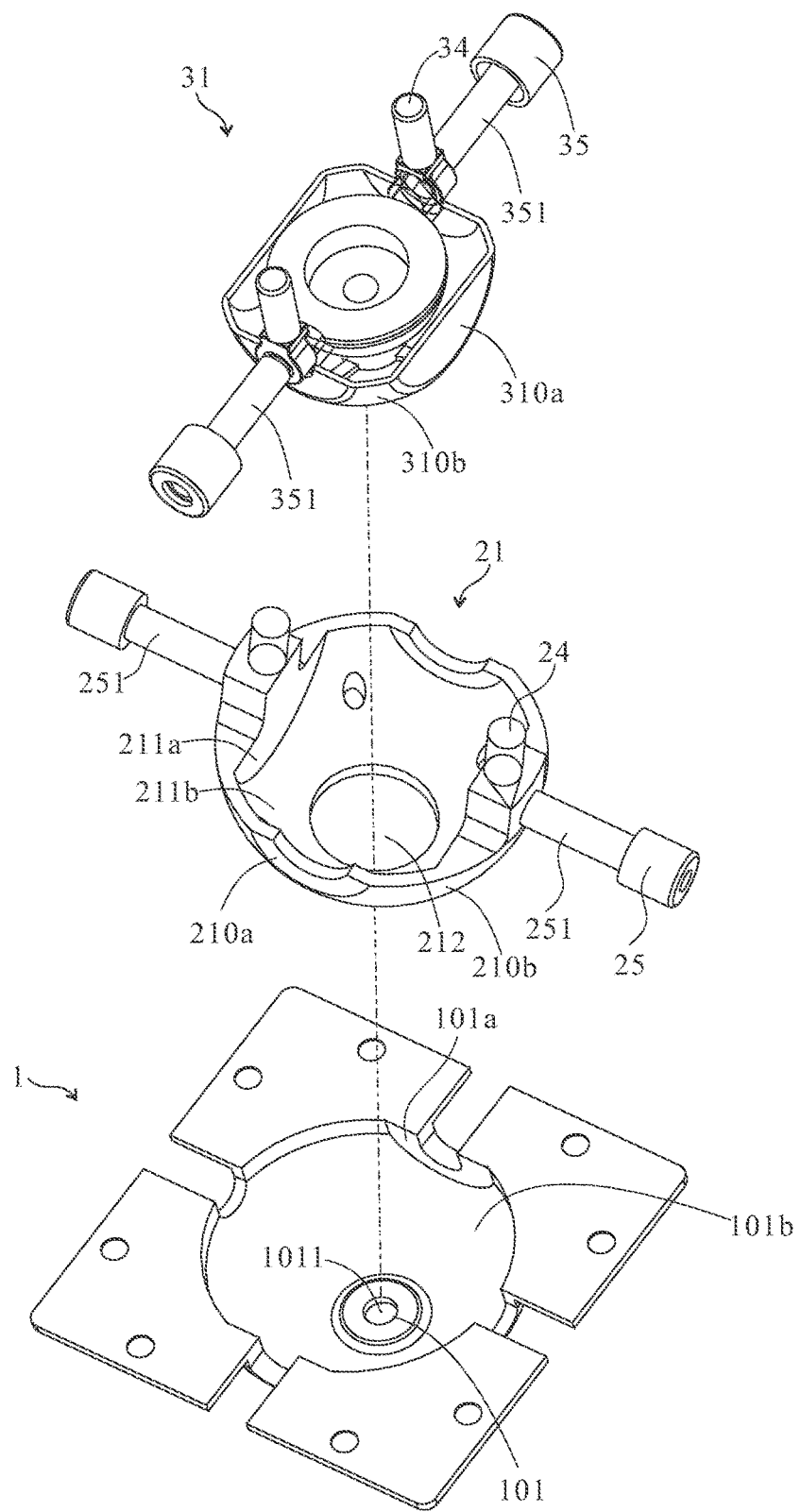
FIGS. 2A and 2B are perspective exploded views in different angles of the adjustable hanging device.
Figure 2B:
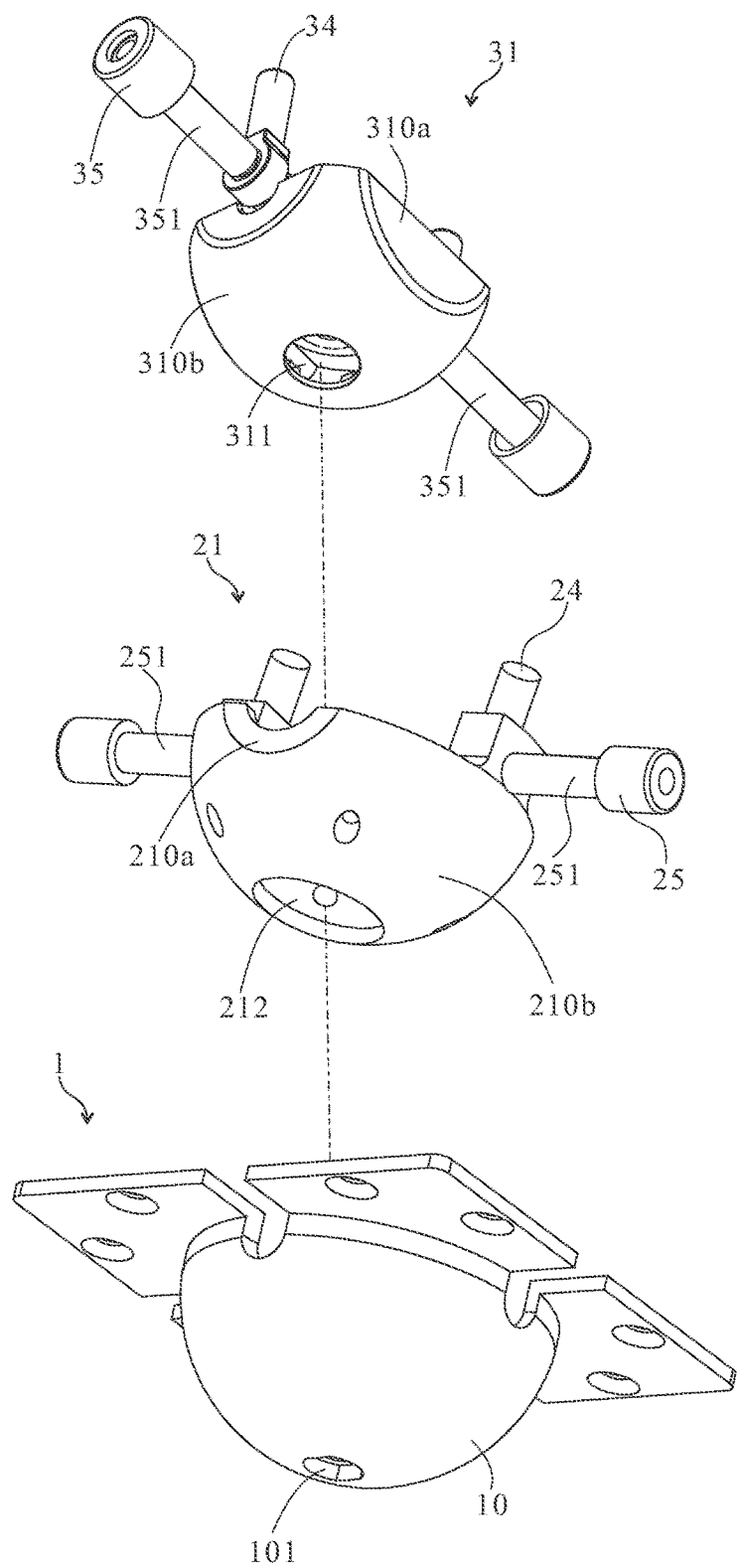

First, detail structures of and operating relationship between the bearing base 1 and the first adjusting module 2 are disclosed. Referring to FIGS. 2A and 2B, perspective exploded views in different angles of the adjustable hanging device of the present invention, with X-axis adjustment and relevant parts, are shown. The bearing base 1 includes a dome member 10. The dome member 10 has two first inner flat surfaces 101a oppositely facing each other and a first inner cambered surface 101b connecting the two first flat surfaces 101a. A center point 1011 is defined within the bearing base 1.

Figure 4:
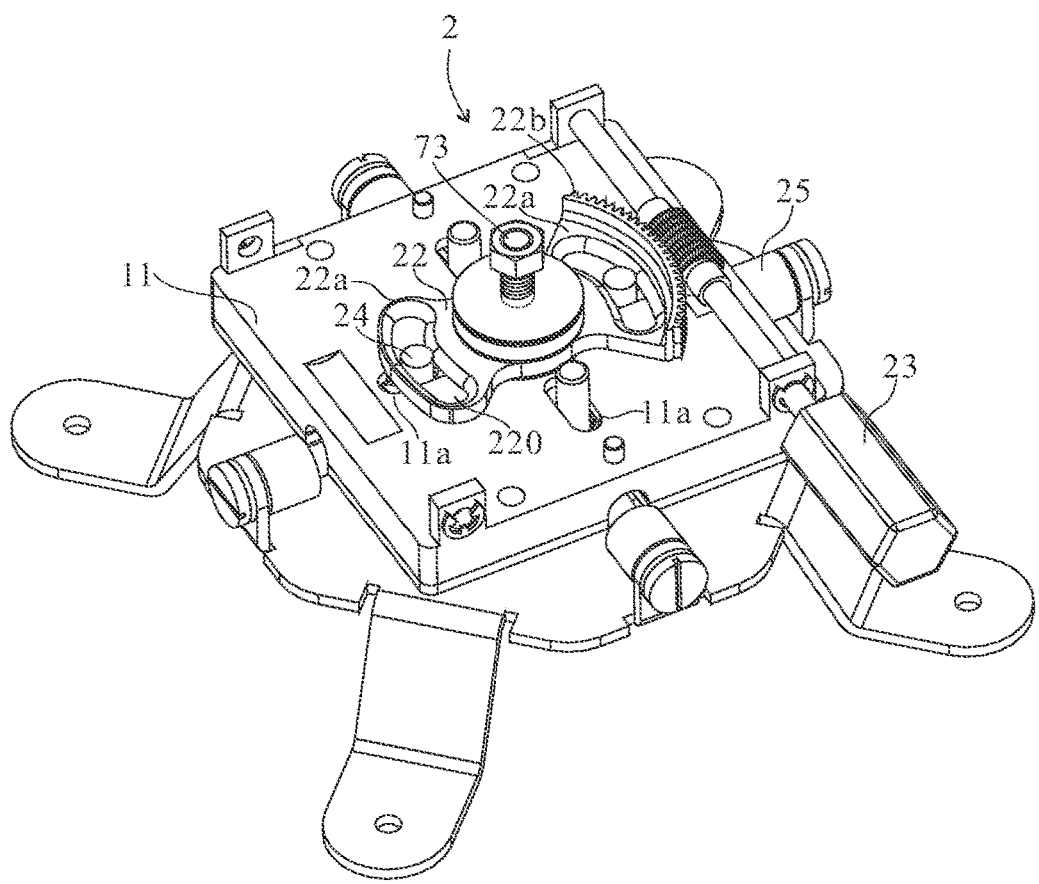
FIG. 4 is a perspective view of part of the adjustable hanging device, wherein the first gear and the first screw rod are disposed in the first housing.

Referring to FIGS. 2A, 2B and 4, the first adjusting module 2 in this embodiment includes a first sliding member 21, a first gear 22, a first screw rod 23, two first adjusting columns 24 and a first shaft 25. It should be noted that the number of the first adjusting columns 24 may be adjusted in other embodiments of the present invention. For example, if first adjusting module 2 has only one first adjusting column 24, the function of the adjusting column 24 still remains.

Referring to FIGS. 2A and 2B, the first sliding member 21 is shaped approximately to a dome corresponding to the dome member 10, and has two second outer flat surfaces 210a oppositely facing away from each other and a second outer cambered surface 210b connecting the two outer flat surfaces 210a. The first shaft 25 includes two shaft bodies 251 separately inserted on the external of the first sliding member 21. The two first adjusting columns 24 are respectively connected to the first sliding member 21 and near the shaft bodies 251. In the embodiment, the shaft bodies 251 are perpendicular to the first adjusting columns 24, but not limited thereof.

Figure 3:
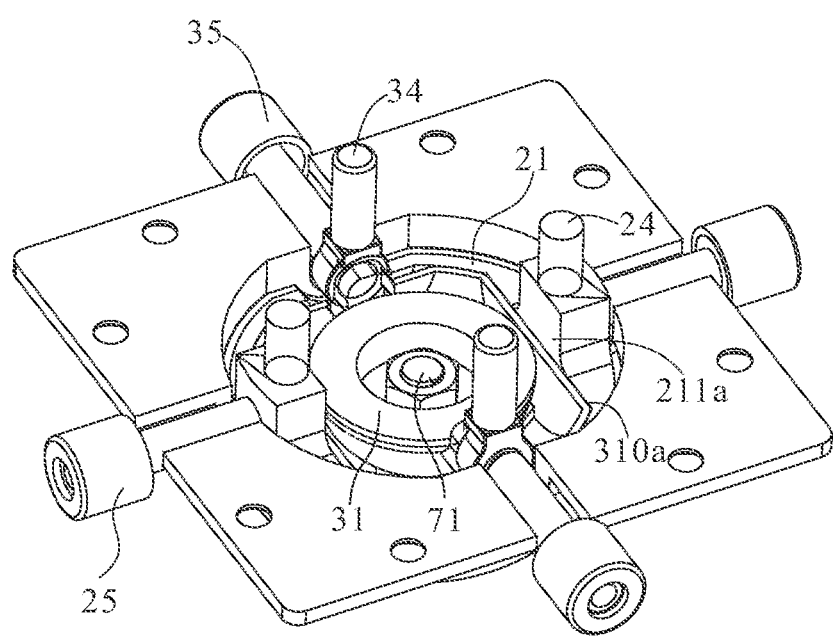
FIG. 3 is a perspective view of part of the adjustable hanging device, wherein the second sliding member is fitted in the first sliding member, and the first sliding member is disposed in the bearing base.

Referring to FIGS. 2A, 2B and 3, FIG. 3 illustrates the first sliding member 21 being disposed in the bearing base 1. When the first sliding member 21 is fitted in the dome member 10 of the bearing base 1, the second outer cambered surface 210b corresponds to the first inner cambered surface 101b, and the second outer flat surfaces 210a correspond to the first inner flat surfaces 101a.

As shown in FIG. 4, the bearing base 1 of the adjustable hanging device includes a first housing 11 simultaneously enclosing the dome member 10 and the first sliding member 21. The first housing 11 has a plurality of first holes 11a and the first adjusting columns 24 penetrate therethrough. Practically, the first holes 11a, for the first adjusting columns 24 penetrating therethrough, are perpendicular to the first screw rod 23. In other words, the first holes 11a extends perpendicularly to the extending direction of the first screw rod 23, and the shaft bodies 251 of the first shaft 25 partially protrude through the side walls of the first housing 11.

FIG. 4 further illustrates the assembly of the first gear 22, the first screw rod 23, the first sliding member 21 and the first housing 11. The first gear 22 is disposed on the first housing 11 and concentrically fitted to the bearing base 1 and the first sliding member 21. The first gear 22 has two wings 22a, each of the wings 22a respectively has a first curved groove 220, and one of the wings 22a has a plurality of teeth 22b. Each of the first adjusting columns 24 respectively elongates through one of the first curved groove 220. The first screw rod 23 engages with the teeth 22b of the first gear 22.

It should be noted that the first housing 11 may be removed in other embodiments of the present invention. The first gear 22 may be disposed directly on the first sliding member 21. Furthermore, in other embodiments of the present invention, the number of the curved grooves 220 may be adjusted according to the number of the first adjusting columns 24. For example, if the first adjusting module 2 only has one first adjusting column 24, there would be only one first curved groove 220 accordingly.

Figure 5A:
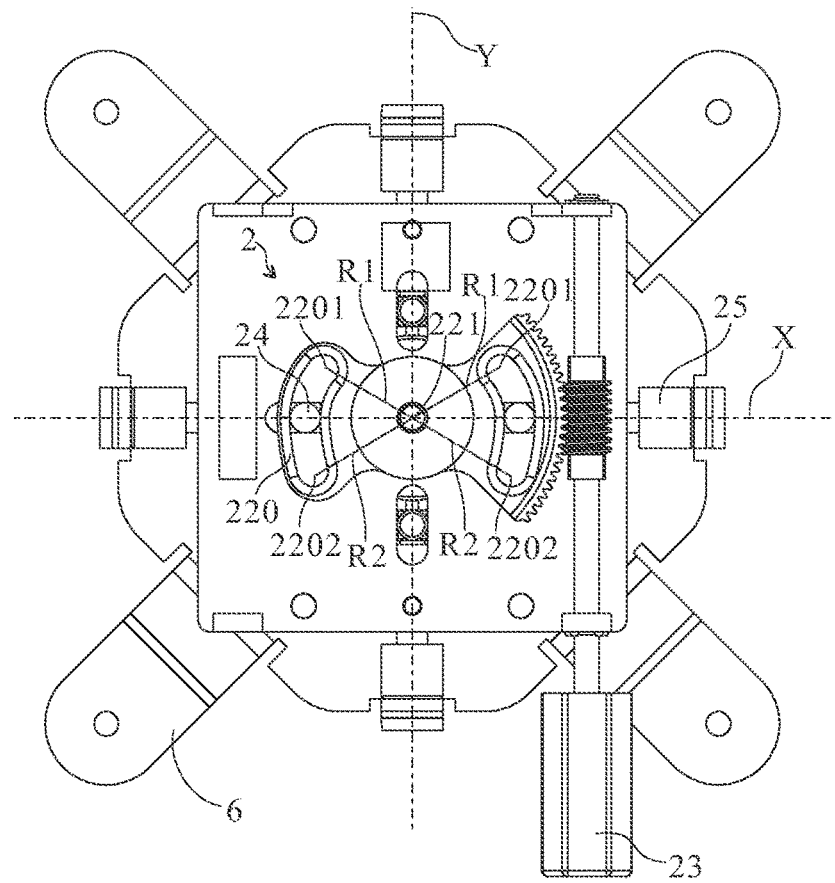
FIG. 5A is a top view of part of the adjustable hanging device.
Figure 5B:
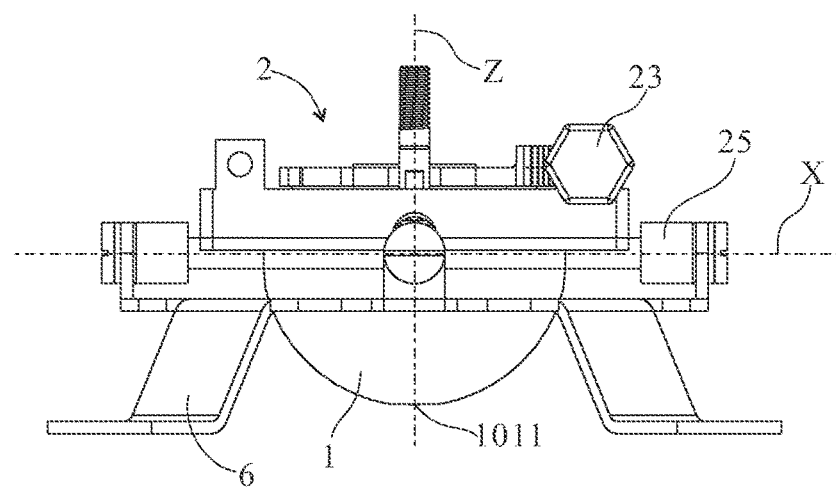
FIG. 5B is a side view of the adjustable hanging device corresponding to FIG. 5A.

FIG. 5A, a top view of part of the adjustable hanging device, and FIG. 5B, a side view of the adjustable hanging device corresponding to FIG. 5A, illustrate the interactions between various parts. Referring to FIG. 5A, X-axis and Y-axis are perpendicular and cross each other on the center 221 of the first gear 22, and X-axis extends through the first shaft 25. Therefore FIG. 5A is a top view of X-Y plane illustrating a status when the first adjusting module 2 and the dome member 10 are not having any interaction.

Referring to FIG. 5B, Z-axis extends through the center point 1011 of the bearing base 1 and is perpendicular to the bearing base 1. X-axis extends through the first shaft 25 and is parallel to the bearing base 1. Therefore FIG. 5B is a side view of X-Z plane illustrating the first shaft 25, X-axis and the bearing base 1 are perpendicular to Z-axis when the first sliding member 21 and the dome member 10 are not having any interaction. It should be noted that X-axis, Y-axis and Z-axis do not have to be perpendicular to one another. They can be approximately perpendicular.

In the embodiment, as shown in FIG. 5A, the two first curved grooves 220 are disposed symmetrically with respect to Y-axis in the wings 22a of the first gear 22. Each of the first curved grooves 220 has a first end 2201 and a second end 2202. A first radius of curvature R1, defined by a straight line between the center 221 of the first gear 22 and the first end 2201, is smaller than a second radius of curvature R2, defined by a straight line between the center 221 of the first gear 22 and the second end 2202. In other words, a radius of curvature increases as it gets closer to the second end 2202 of either of the first curved grooves 220.

Figure 5C:
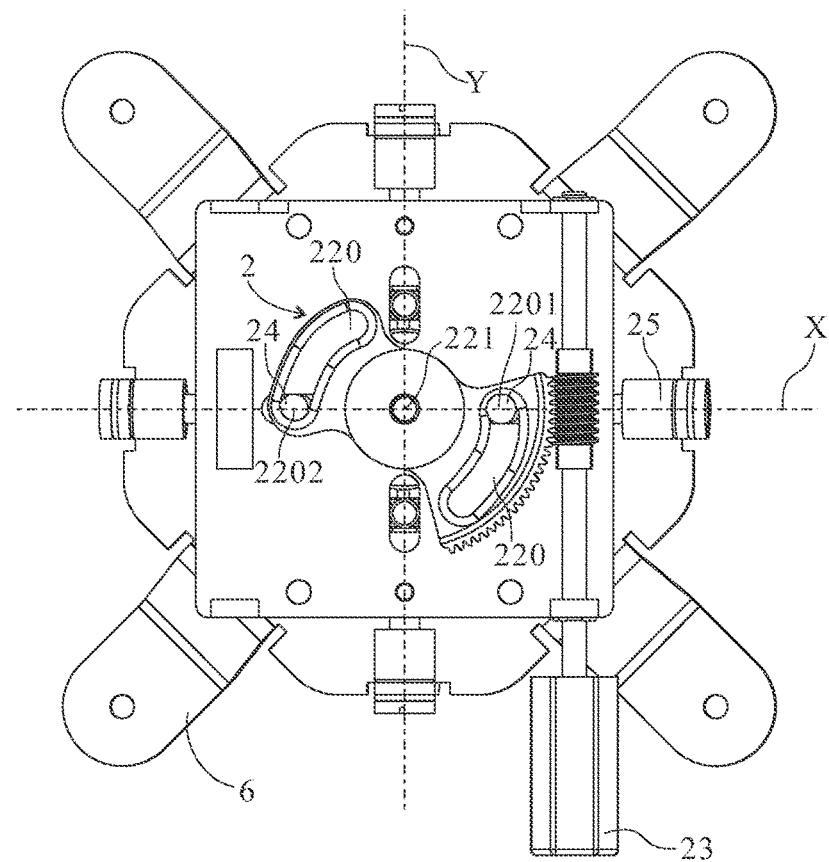
FIG. 5C is a top view of the first adjusting module of the adjustable hanging device in action.
Figure 5D:
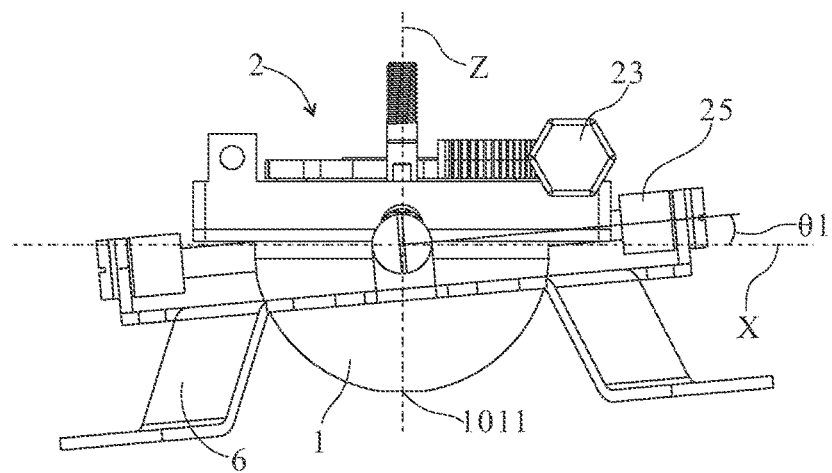
FIG. 5D is a side view of the adjustable hanging device in action corresponding to FIG. 5C.
Figure 5E:
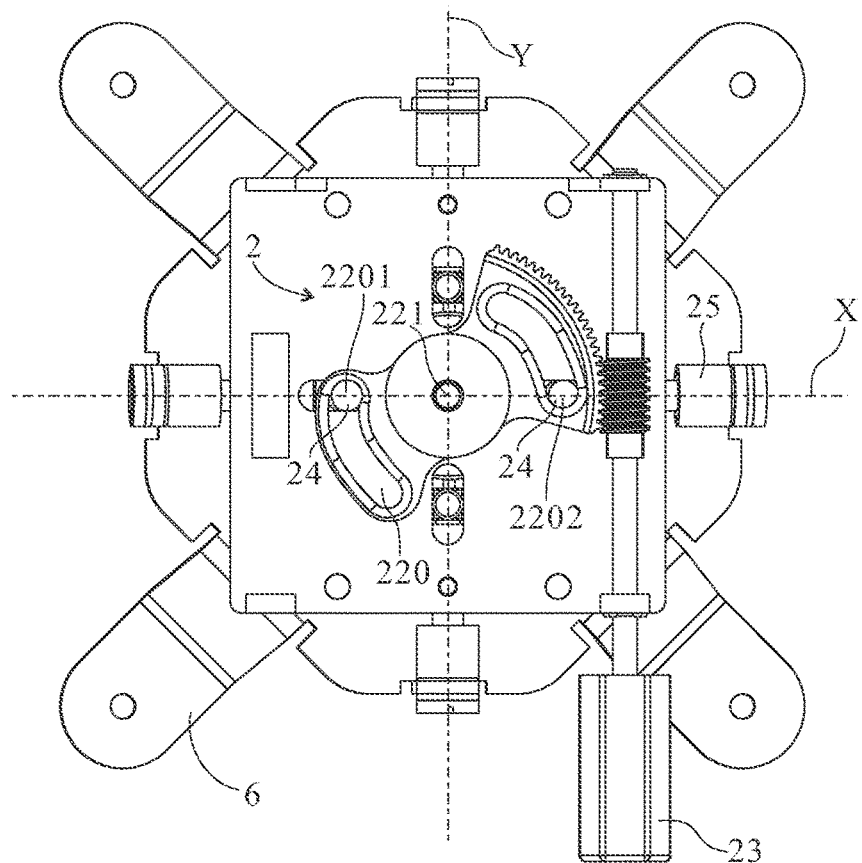
FIG. 5E is another top view of the first adjusting module of the adjustable hanging device in action.
Figure 5F:
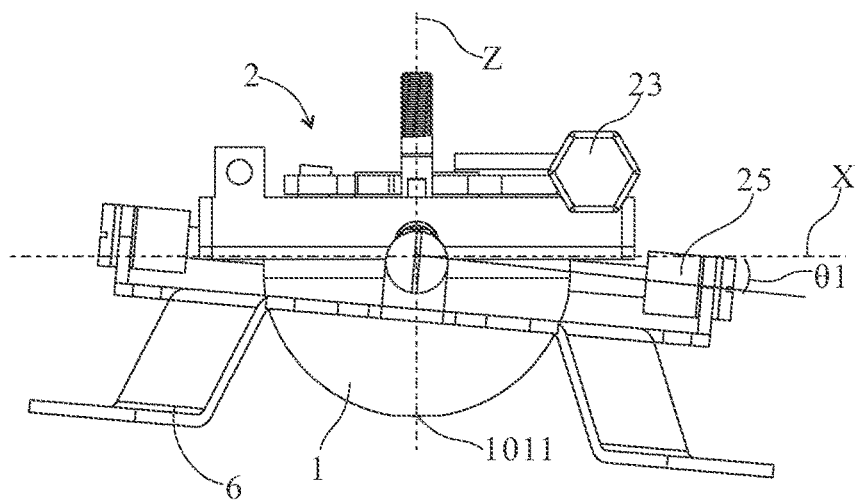
FIG. 5F is another side view of the adjustable hanging device in action corresponding to FIG. 5E.

FIG. 5C is a top view illustrating the first sliding member 21 relatively slides with respect to the bearing base 1 when the first screw rod 23 is driving the first gear 22. FIG. 5D is a side view illustration corresponding to FIG. 5C. FIG. 5E is another top view illustrating the first sliding member 21 relatively slides with respect to the bearing base 1 when the first screw rod 23 is driving the first gear 22. FIG. 5F is a side view illustration corresponding to FIG. 5E.

Figure 5G:
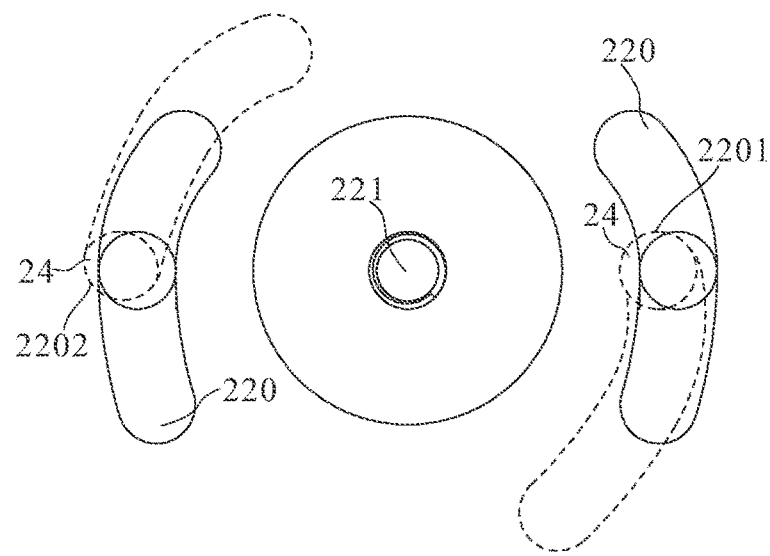
FIG. 5G is a schematic illustration of the first adjusting columns of FIGS. 5A and 5C relatively moving with respect to the first curved grooves of the first gear.
Figure 5H:
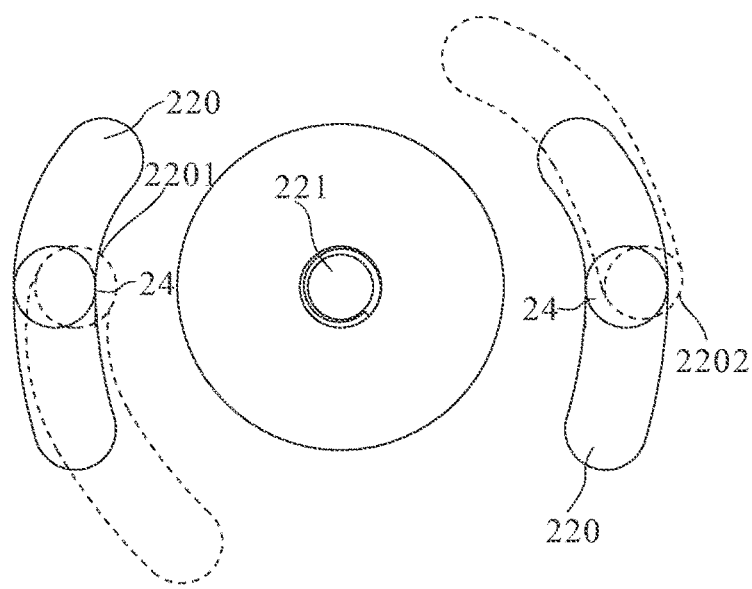
FIG. 5H is another schematic illustration of the first adjusting columns of FIGS. 5A and 5E relatively moving with respect to the first curved grooves of the first gear.

FIG. 5G is a schematic illustration of the first adjusting columns 24 of FIGS. 5A and 5C relatively moving with respect to the first curved grooves 220 of the first gear 22. FIG. 5H is a schematic illustration of the first adjusting columns 24 of FIGS. 5A and 5E relatively moving with respect to the first curved grooves 220 of the first gear 22.

Through the arrangement of various parts mentioned above, the first screw rod 23 drives the first gear 22 to rotate around the center 221. As compared to the first gear 22 in FIG. 5A, the first gear 22 in FIG. 5C rotates clockwise around the center 221. The first adjusting columns 24 are restricted within the first curved grooves 220 and slides relatively in respect of the first gear 22. In other words, the inner surface of the first curved grooves 220 push the first adjusting columns 24 to slide within the first curved grooves 220 when the first gear 22 is rotating.

While the first adjusting columns 24 are sliding, as shown in FIG. 5G, each of the adjusting columns 24 moves from the center to the left (dot lines). One of the adjusting columns 24 (the first adjusting column 24 on the right hand side) is positioned in the second end 2202 of one of the first curved grooves 220, and another one of the first adjusting columns 24 (the first adjusting column 24 on the left hand side) is positioned in the first end 2201 of another one of the first curved grooves. At the same time, the second outer cambered surface 210b relatively slides in respect of the first inner cambered surface 101b due to the restrictions of the first inner flat surfaces 101a and the second outer flat surfaces 210a, so as to drive the first sliding member 21 relatively sliding with respect to the bearing base 1. Therefore, the first shaft 25 is driven to deviate from X-axis and relatively tilts at a first angle θ1 in respect of X-axis and the bearing base 1 from the side view of X-Z plane.

When the first screw rod 23 drives the first gear 22 to rotate anti-clockwise around the center 221 in FIG. 5E, each of the adjusting columns 24 moves from the center to the right in FIG. 5H, and one of the adjusting columns 24 (the first adjusting column 24 on the right hand side) is positioned in the first end 2201 of one of the first curved grooves 220, and another one of the first adjusting columns 24 (the first adjusting column 24 on the left hand side) is positioned in the second end 2202 of another one of the first curved grooves. At the same time, the second outer cambered surface 210b relatively slides in respect of the first inner cambered surface 101b due to the restrictions of the first inner flat surfaces 101a and the second outer flat surface 210a, so as to drive the first sliding member 21 relatively sliding with respect to the bearing base 1. From the side view of X-Z plane, the first shaft 25 is driven to deviate from X-axis and relatively tilts at a first angle θ1 in respect of X-axis and the bearing base 1. In the embodiment, the first angle θ1 is preferably between −5 and 5 degrees. However, the adjustable range of the first angle θ1 may vary and does not have any specific limitation in other embodiments of the present invention.

And now, Y-axis adjustment and relevant parts will be discussed to disclose detailed structures of the second adjusting module 3. With reference to FIGS. 2A, 2B, 3 and 6, the second adjusting module 3 includes a second sliding member 31, a second gear 32, a second screw rod 33, two second adjusting columns 34 and a second shaft 35. Also, it should be noted that the number of the second adjusting columns 34 may be adjusted in other embodiments of the present invention.

With reference to FIGS. 2A and 2B, the second sliding member 31 has two third outer flat surfaces 310a oppositely facing away from each other and a third outer cambered surface 310b connecting the third outer flat surfaces 310a. The second shaft 35 has two shaft bodies 351 separately inserted on the external of the second sliding member 31. The two second adjusting columns 34 are respectively connected to the second sliding member 31 and near to the shaft bodies 351. In the embodiment, the shaft bodies 351 are perpendicular to the second adjusting columns 34, but not limited thereof.

Figure 6:
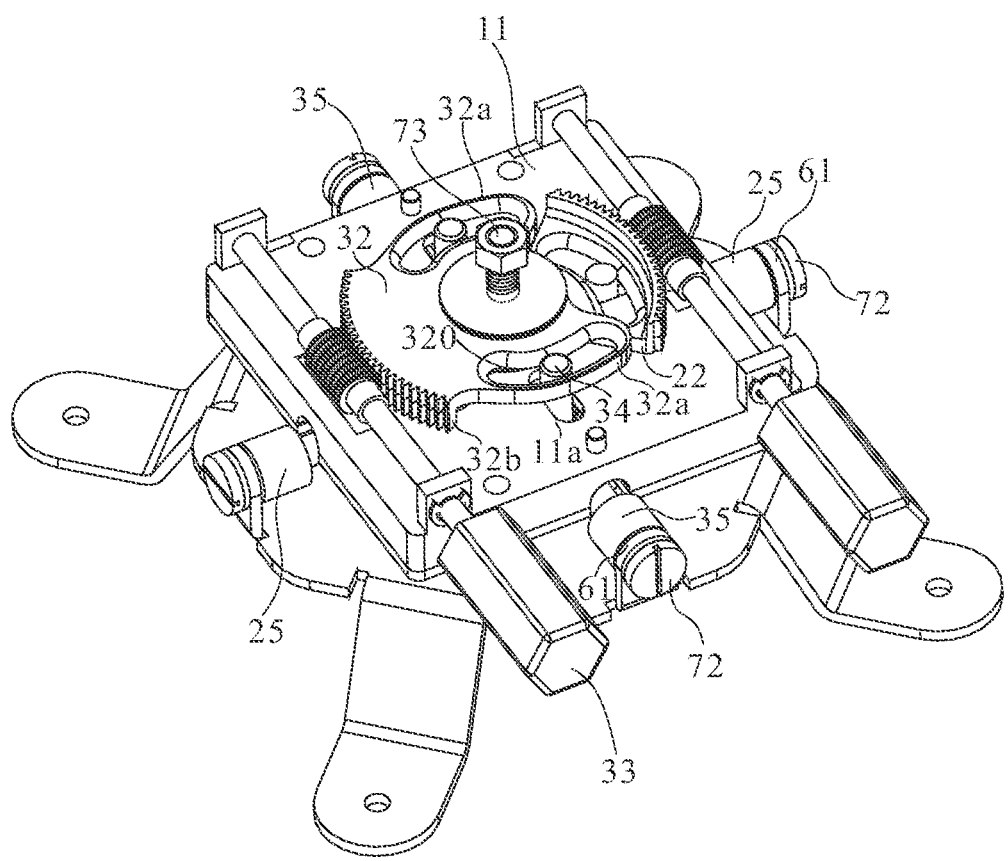
FIG. 6 is a perspective view of the adjustable hanging device wherein the second gear and the second screw rod are disposed in the first housing.

FIG. 3 illustrates the second sliding member 31 fitting in the first sliding member 21. As shown in FIGS. 2A and 3, the first sliding member 21 has two second inner flat surfaces 211a oppositely facing each other and a second inner cambered surface 211b connecting the two second inner flat surfaces 211a. When the second sliding member 31 is fitted in the first sliding member 21, the second inner cambered surface 211b corresponds to the third outer cambered surface 310b, and each of the second inner flat surfaces 211a respectively corresponds to one of the third outer surfaces 310a. The second adjusting columns 34 are connected to the second sliding members 31. Similarly in the embodiment of the adjustable hanging device of the present invention shown in FIG. 4, the first housing 11 simultaneously encloses bearing base 1, the first sliding member 21 and the second sliding member 31, and allows the first adjusting columns 24 and the second adjusting columns 34 penetrate through the first holes 11a. In the embodiment, as shown in FIG. 6, the first holes 11a penetrated by the second adjusting columns 34 are parallel to the second screw rod 33. In other words, the first holes 11a penetrated by the second adjusting columns 34 and the first screw rod 23 extend in the same direction.

FIG. 6 illustrates the second gear 32 and the second screw rod 33 fitting in the first housing 11. When the first gear 22 is fitted in the first housing 11 as shown in FIG. 4, the second gear 32 may be concentrically disposed on the first gear 22 as shown in FIG. 6. The second gear 32 has two wings 32a, each of the wings 32a has a second curved groove 320, and one of the wings 32a has a plurality of teeth 32b. The second adjusting columns 34 elongate through the second curved grooves 320. The second screw rod 33 engages with the teeth 32b of the second gear 32. It should be noted that the number of curved grooves 320 may be adjusted according to the number of the second adjusting columns 34 in other embodiments of the present invention. For example, if the second adjusting module 3 only has a second adjusting column 34, there is only one second curved groove 320 in correspondence to one second adjusting column 34.

Figure 7A:
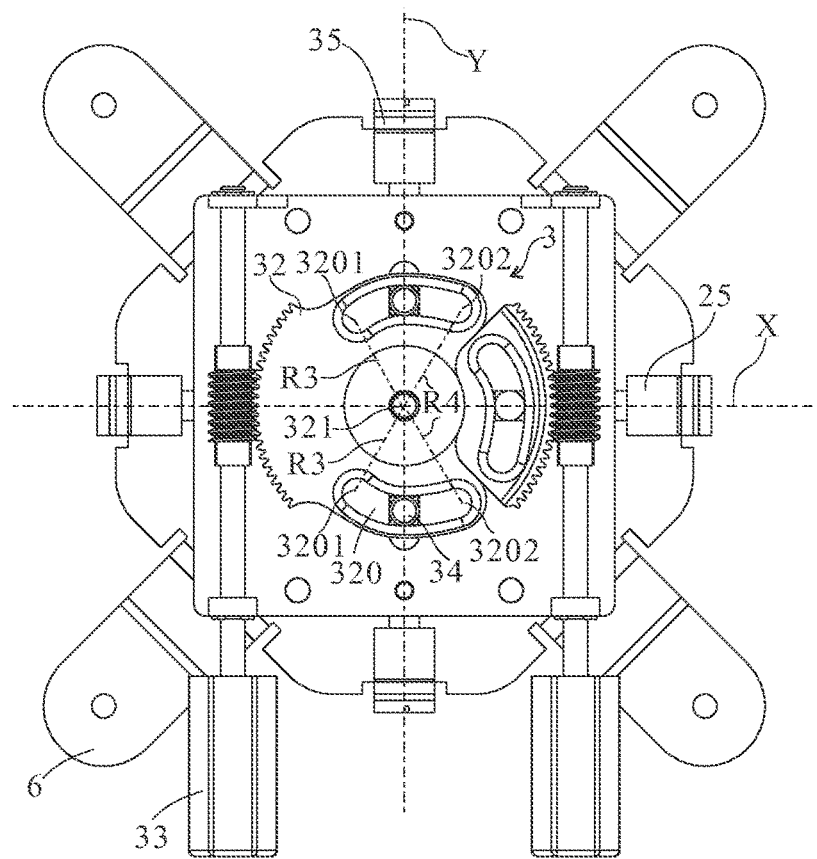
FIG. 7A is another top view of part of the adjustable hanging device.
Figure 7B:
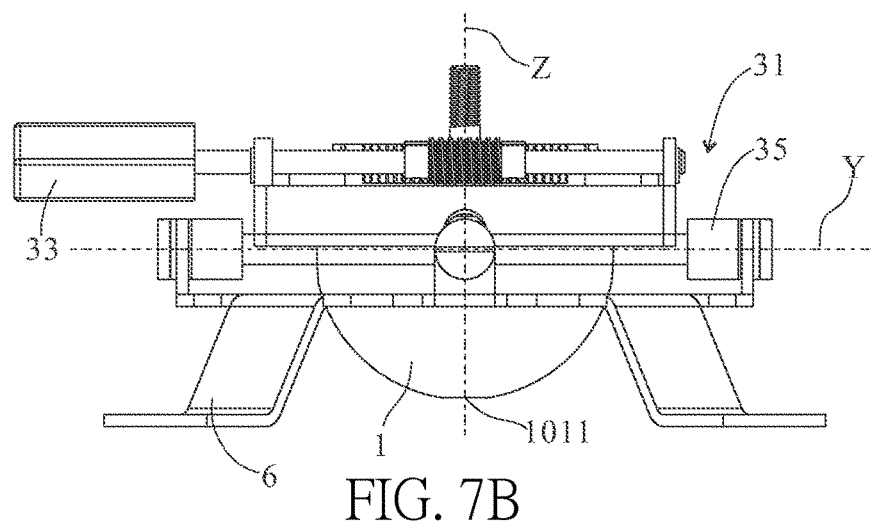
FIG. 7B is a side view of part of the adjustable hanging device corresponding to FIG. 7A.

FIG. 7A is a top view of part of the adjustable hanging device, and FIG. 7B is a side view corresponding to FIG. 7A. In FIG. 7A, in order to explain the interactions between various parts, it is assumed that X-axis and Y-axis are perpendicular to each other and cross on the center 321 of the second gear 32. Y-axis extends through the second shaft 35 and X-axis extends through the first shaft 25. Therefore, FIG. 7A is a top view of X-Y plane illustrating a status when the second sliding member 31 and the bearing base 1 are not having any interactions. In FIG. 7B, it is assumed that Z-axis extends through the center point 1011 of the bearing base 1 and is perpendicular to the bearing base 1. Y-axis extends through the second shaft 35 and is parallel to the bearing base 1. Therefore, FIG. 7B is a side view of Y-Z plane illustrating the second sliding member 31 and the bearing base 1 are not having any interactions. The second shaft 35, Y-axis and the bearing base 1 are perpendicular to Z-axis.

In the embodiment, as shown in FIG. 7A, the two second curved grooves 320 are disposed symmetrically with respect to X-axis in the wings 32a of the second gear 32. Each of the second curved grooves 320 has a third end 3201 and a fourth end 3202. A third radius of curvature R3, defined by a straight line between the center 321 of the second gear 32 and the third end 3201, is smaller than a fourth radius of curvature R4, defined by a straight line between the center 321 of the second gear 32 and the fourth end 3202. In other words, a radius of curvature increases as it gets closer to the fourth end 3202 of either of the second curved grooves 320.

Figure 7C:
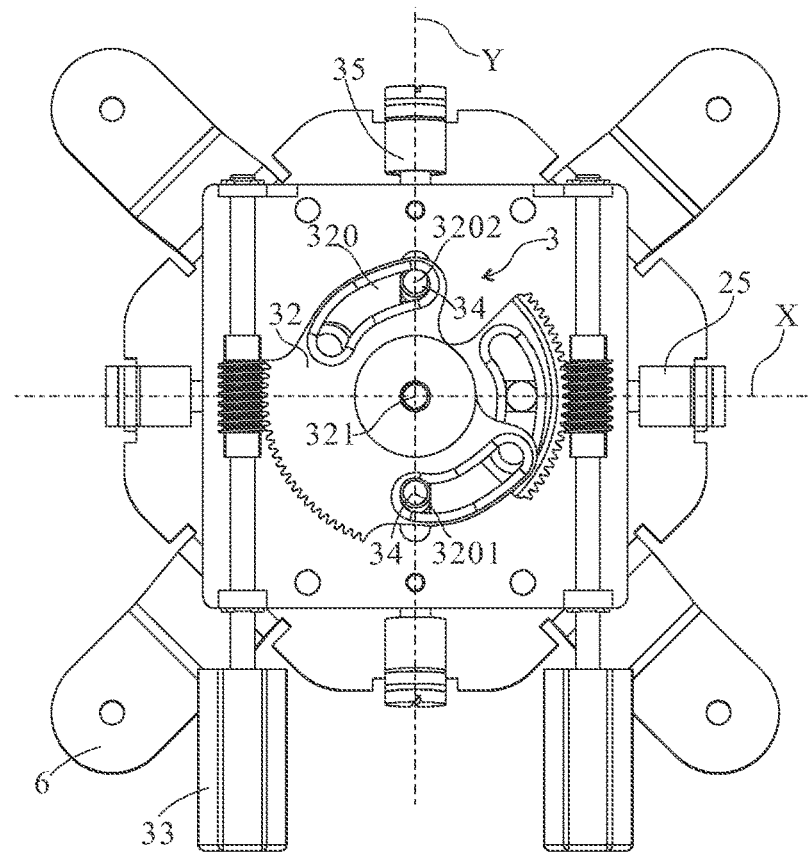
FIG. 7C is a top view of the second adjusting module of the adjustable hanging device in action.
Figure 7D:
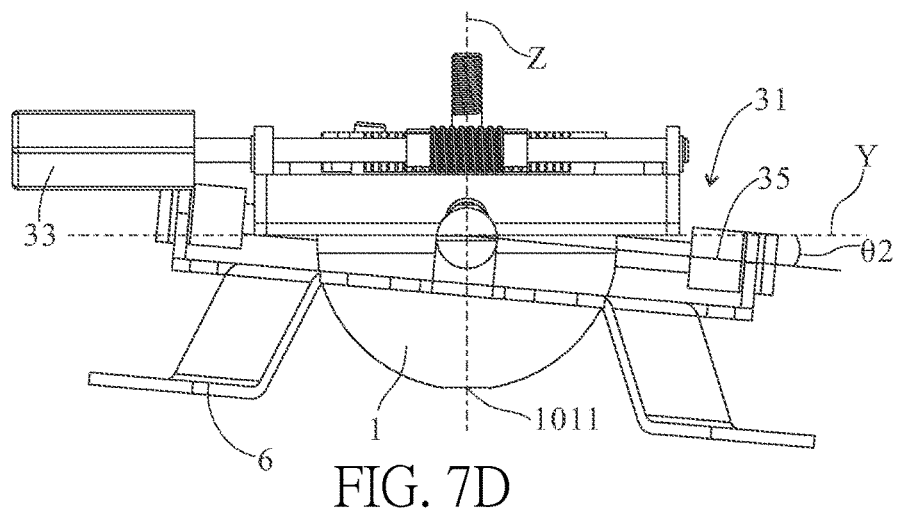
FIG. 7D is a side view of the second adjusting module in action corresponding to FIG. 7C.
Figure 7E:
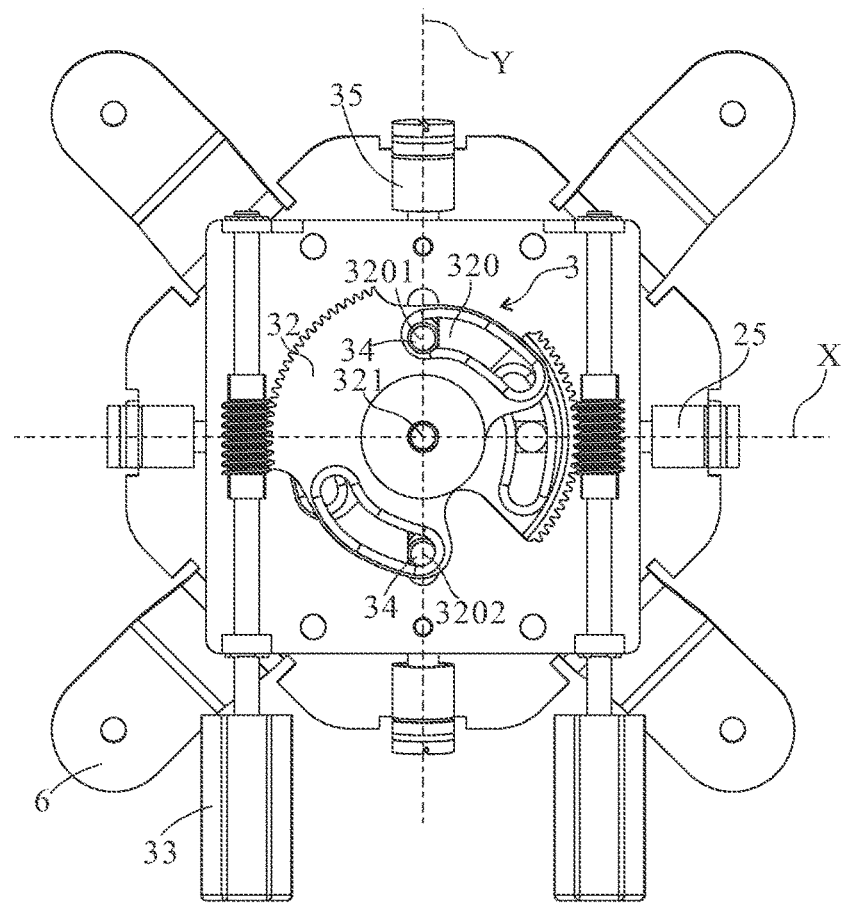
FIG. 7E is another top view of the second adjusting module of the adjustable hanging device in action.
Figure 7F:
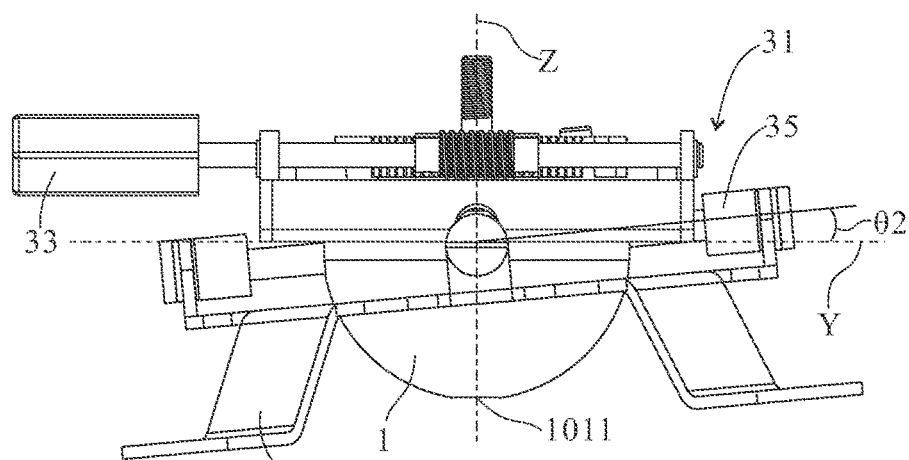
FIG. 7F is another side view of the second adjusting module in action corresponding to FIG. 7E.

FIG. 7C is a top view illustrating the second sliding member 31 relatively slides with respect to the bearing base 1 when the second screw rod 33 is driving the second gear 32. FIG. 7D is a side view illustration corresponding to FIG. 7C. FIG. 7E is another top view illustrating the second sliding member 31 relatively slides with respect to the bearing base 1 when the second screw rod 33 is driving the second gear 32. FIG. 7F is a side view illustration corresponding to FIG. 7E.

Through the arrangement of various parts are discussed above and similar to the adjustment principle in X-axis, the second screw rod 33 drives the second gear 32 to rotate anti-clockwise around the center 321. The inner surface of the second curved groove 320 pushes the second adjusting columns 34 to slide within the second curved groove 320. Due to the restrictions of the second inner flat surfaces 211a and third outer flat surfaces 310a, the third outer cambered surface 310b relatively slides in respect of the second inner cambered surface 211b, so that the second sliding member 31 relatively slides in respect of the bearing base 1. In the view of Y-Z plane, the second sliding member 31 relatively sliding in respect of the bearing base 1 causes the second shaft 35 to deviate from Y-axis and tilt in the second angle θ2 in respect of the bearing base 1 and Y-axis.

In a contrary, FIG. 7E illustrates the second gear 32 rotating clockwise around the center 321 in the same movements disclosed earlier. In the view of Y-Z plane, the second shaft 35 is driven to deviate from Y-axis and tilt to the second angle θ2 in respect of the bearing base 1 and Y-axis. In the embodiment, the second angle θ2 is preferably between −5 and 5 degrees, but not limited thereto.

With reference to FIGS. 2A, 2B and 3, the bearing base 1 is formed with a first fixing hole 101 on the dome member 10. The first sliding member 21 is formed with a first through hole 212. The second sliding member 31 is formed with a second through hole 311. A first screw 71 penetrates through the first through hole 212 and second through hole 311 to screw with the first fixing hole 101. To avoid interference from the first screw 71 while the first sliding member 21 and the second sliding member 311 are sliding, the diameters of the first through hole 212 and second through hole 311 are larger than the diameter of the first screw 71.

Figure 10:
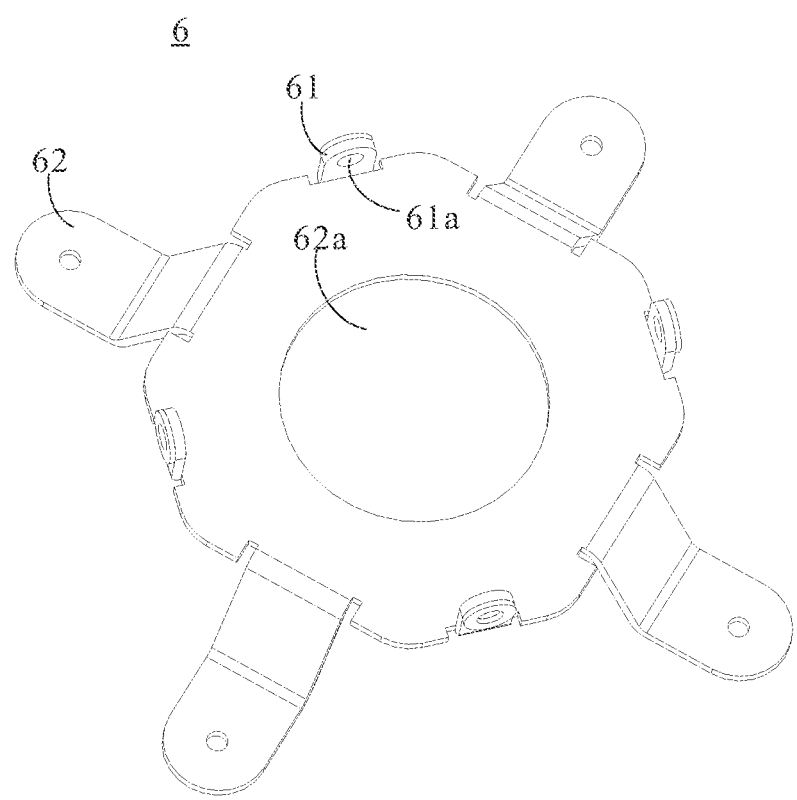
FIG. 10 is a perspective view of the bracket of the adjustable hanging device.

FIG. 10 is a schematic illustration of the bracket 6. The bracket 6 includes a plurality of first bending portions 61 and a plurality of second bending portions 62. Each of the first bending portions 61 has a second hole 61a, as shown in FIG. 6, for accommodating ends of the first shaft 25 and the second shaft 35. A plurality of second screws 72 are respectively fastened on the first shaft 25 and the second shaft 35.

Figure 11:
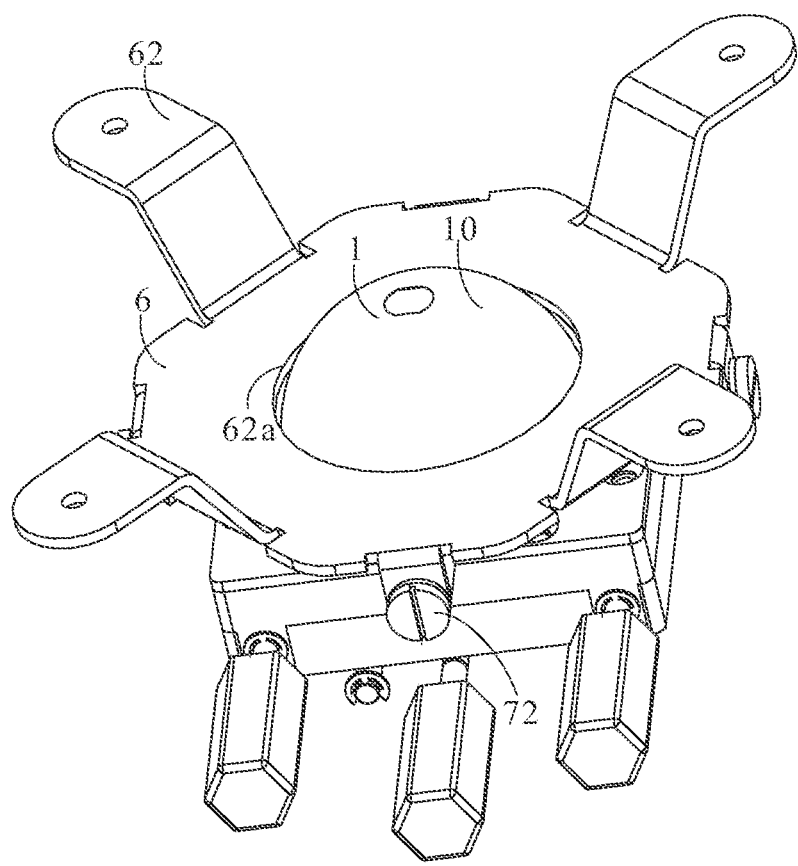
FIG. 11 is a schematic illustration of the corresponding bracket and bearing base.

FIG. 11 is a schematic illustration of the corresponding bracket 6 and bearing base 1. The bracket 6 has a third hole 62a, and the dome member 10 of the bearing base 1 is disposed in the third hole 62a. The second bending portions 62 of the bracket 6 may be attached to an electronic device (not shown). As shown in FIGS. 5A to 5E and 7A to 7E, the bracket 6 moves together with the first shaft 25 in respective of the bearing base 1 when the first sliding member 21 is relatively sliding in respect of the bearing base 1. The bracket 6 moves together with the second shaft 35 in respect of the bearing base 1 when the second sliding member 31 is relatively sliding in respect of the bearing base 1. So that the electronic device attached to the bracket 6 relatively moves in respect of the bearing base 1.

It should be noted that the third hole 62a of the bracket 6 is slightly larger than the diameter of the dome member 10 of the bearing base 1, the second screws 72 are fastened on the first shaft 25 and second shaft 35 with a gap from their respective first bending portions 61, and the diameters of the second holes 61a are larger than the diameters of the first shaft 25 and second shaft 35, so that the bracket 6 is not over tightly attached to the first shaft 25 and second shaft 35. Therefore, the first shaft 25 and second shaft 35 may freely rotate in respect of corresponding second holes 61a. It will prevent the bracket 6 from being overly restricted or even locked while rotating on X-Z plane or Y-Z plane, or being unable to move in respect of the bearing base 1 because the third hole 62a is stuck with the dome member 10 of the bearing base 1.

Figure 8:
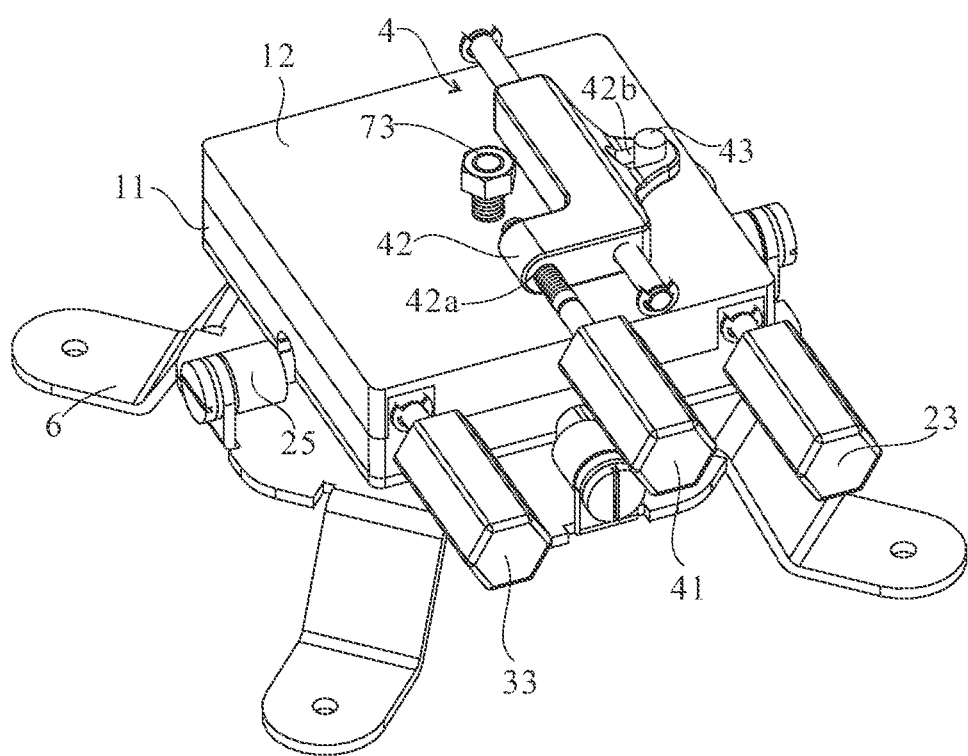
FIG. 8 is a perspective view illustration of the third adjusting module disposed on the second housing of the adjustable hanging device.

Referring to FIGS. 4, 6 and 8, wherein FIG. 8 is schematic illustration of the partly assembly of the adjustable hanging device of the present invention. A plurality of third screws 73 respectively are screwed with the center through hole of the first gear 22, the center through hole of the second gear 32, the center through hole of the first housing 11 and the center through hole of the second housing 12, so that they are connected to each other. Therefore, the center of the second housing 12 and the center point 1011 of the bearing base 1, viewed from X-Y plane, are in the same position.

Lastly, Z-axis adjustment and relevant parts are discussed herefrom. With reference to FIG. 8, the bearing base 1 includes the second housing 12 enclosing the first adjusting module 2 and the second adjusting module 3, is connected to the first housing 11, and allows the first screw rod 23, the second screw rod 33, the first shaft 25 and the second shaft 35 to partly reveal. The third adjusting module 4 is disposed on the second housing 12 and fitted to the first adjusting module 2 and the second adjusting module 3. The third adjusting module 4 includes a third screw rod 41, a sliding block 42 and a third adjusting column 43. The sliding block 42 has a thread portion 42a and a sliding groove 42b. The thread portion 42a engages with the third screw rod 41. The third adjusting column 43 is disposed on the second housing 12 and penetrates through the sliding groove 42b, and thus drives the first adjusting module 2 and the second adjusting module 3. More details will be discussed further. It should be noted that the sliding groove 42b penetrated by the third adjusting column 43 is perpendicular to the third screw rod 41. In other words, the sliding groove 42b, penetrated by the third adjusting column 43, extends in a direction perpendicular to a extending direction of the third screw rod 41.

Figure 9A:
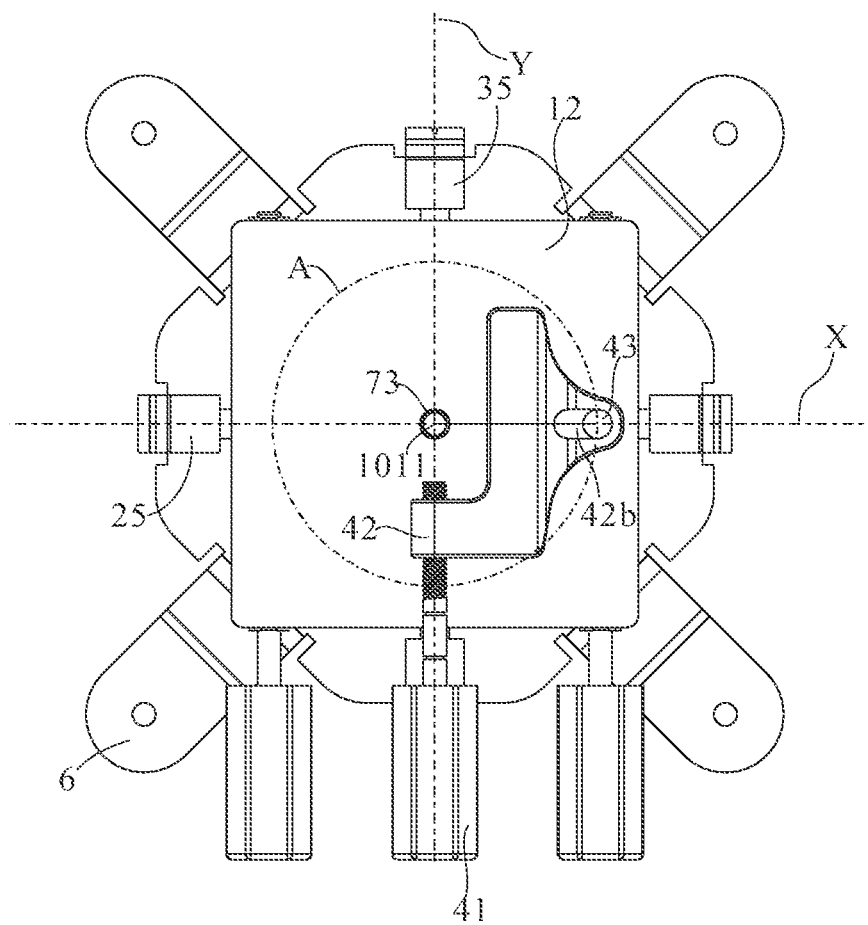
FIG. 9A is a top view of part of the adjustable hanging device.

Movements of the third adjusting module 4 are disclosed in more details herefrom. FIG. 9A is a top view of part of the adjustable hanging device. It is also assumed that X-axis is perpendicular to Y-axis, X-axis extends through the first shaft 25, Y-axis extends through the second shaft 35, and X-axis and Y-axis cross on the center of the second housing 12 (same as the center point 1011 of the bearing base 1). Hence FIG. 9A is a top view of X-Y plane illustrating a status when the third adjusting module 4 is not interacting with the bearing base 1, the first adjusting module 2 and the second adjusting module 3. The second housing 12 has the center which is the same as the center point 1011 of the bearing base 1. The center point 1011 of the bearing base 1 may define a first circumference (A), and the third adjusting column 43 is on the first circumference (A). The center point 1011 of the bearing base 1 is aligned with the third adjusting column 43 on X-axis.

Figure 9B:
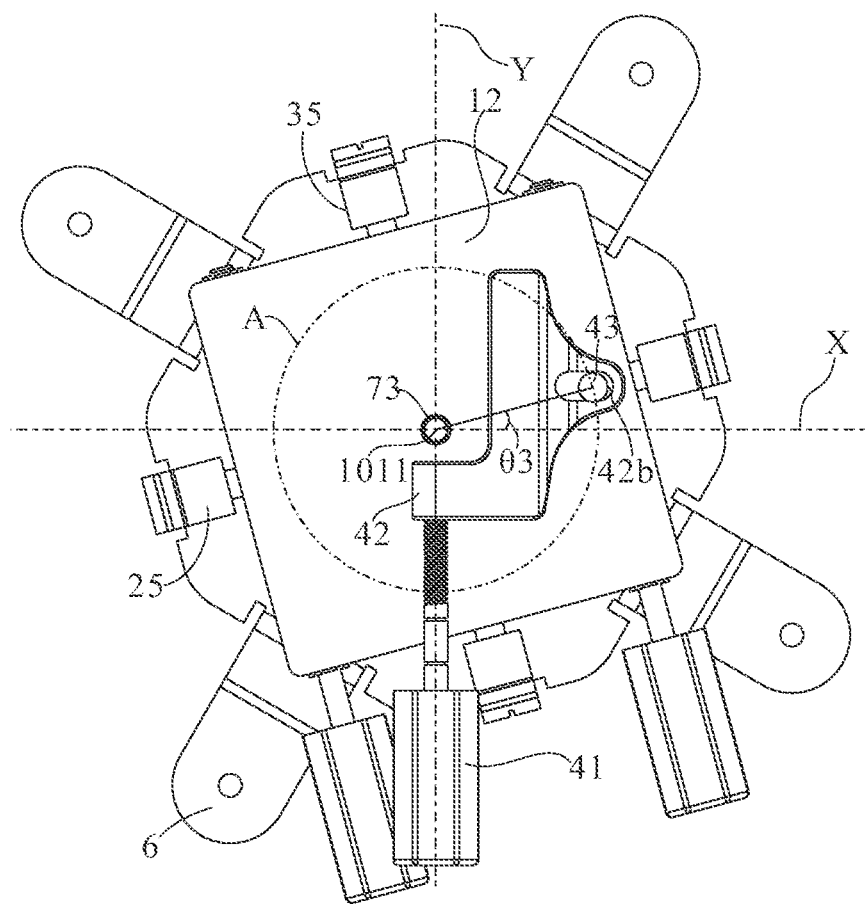
FIG. 9B is a top view of the third adjusting module of the hanging device in action.
Figure 9C:
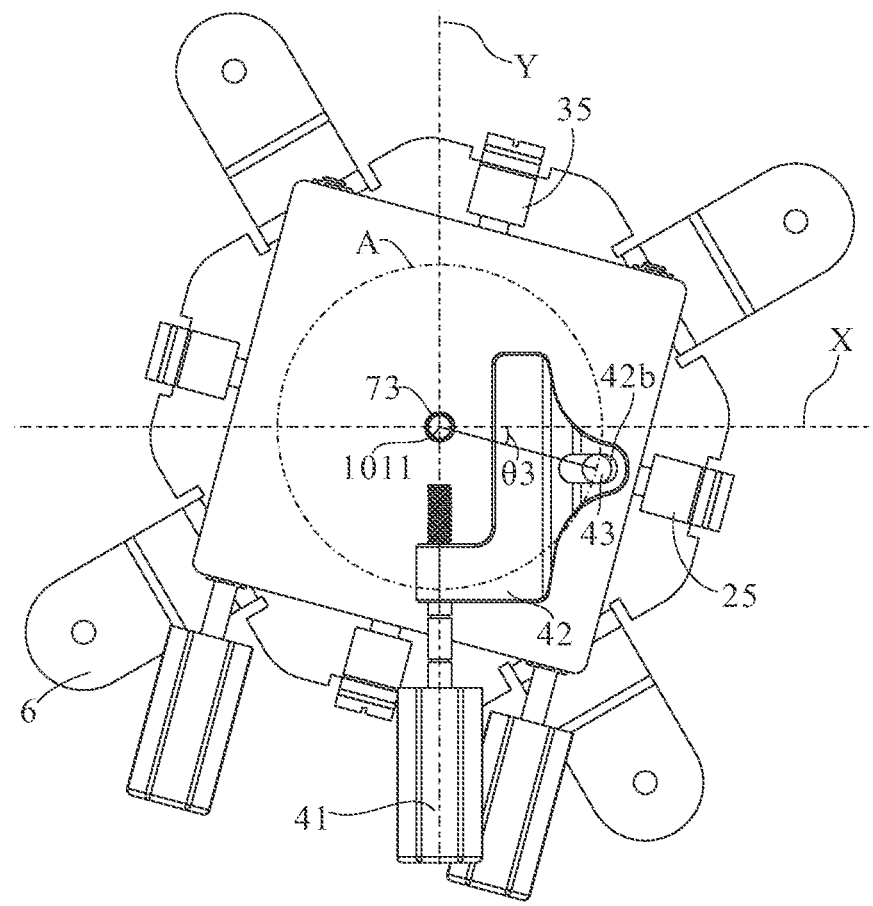
FIG. 9C is another top view of the third adjusting module of the hanging device in action.

FIG. 9B is a top view illustrating the first adjusting module 2 and the second adjusting module 3 rotate around the center point 1011 of the bearing base 1 when the third screw rod 41 is driving sliding block 42. FIG. 9C is another top view illustrating a different rotating direction. When the third screw rod 41 is driving sliding block 42, as shown in FIG. 9B, the third adjusting column 43 not only relatively slides in the sliding groove 42b, but also rotates anti-clockwise around the center point 1011, so that the straight line between the third adjusting column 43 and the center point 1011 deviates from X-axis. Contrarily, as shown in FIG. 9C, the third adjusting column 43 rotates clockwise around the center point 1011. The third adjusting column 43 relatively rotates around the center point 1011, drives the second housing 12 and the first housing 11 connected to the second housing 12 to rotate, and simultaneously drives the first adjusting module 2 and second adjusting module 3 enclosed in the first housing 11 and the second housing 12 to relatively rotate around the center point 1011 of the bearing base 1. Since the bracket 6 is connected to the first shaft 25 and the second shaft 35, the bracket 6 also rotates with the first adjusting module 2 and the second adjusting module 3. With reference to FIGS. 9B and 9C, the first shaft 25 and the second shaft 35 respectively and simultaneously deviate from X-axis and Y-axis, so that the first shaft 25 and the second shaft 35 simultaneously rotate clockwise or anti-clockwise on the X-Y plane. Therefore, when the first shaft 25 relatively rotates around the center point 1011 of the bearing base 1, a third angle θ3 is formed between X-axis and the straight line between the third adjusting column 43 and the center point 1011. The third angle θ3 is preferably between −5 and 5 degrees, but not limited thereto.

Through the arrangement of the three adjusting modules discussed above, the first screw rod 23, the second screw rod 33 and the third screw rod 41 extend on the same operating side to the ease of an user.

Finally, as illustrated in FIG. 1, the adjustable hanging device may have a third housing 51 enclosing the third adjusting module 4 and allow the third screw rod 41 to partly reveal. The third housing 51 may be screwed with the third screw 73. The third housing 51 may be connected to a fixing bracket that may be hung onto the ceiling.

In conclusion, it may be achieved to have the first screw rod, the second screw rod and the third screw rod on the same operating side through the structures of the first adjusting module, the second adjusting module and the third adjusting module mentioned above. A user may operate three screw rods to adjust positions of the electronic device in different dimensions with ease on the same side. The operation convenience is greatly improved.

Although the present invention has been explained in relation to its preferred embodiment, it is to be understood that many other possible modifications and variations can be made without departing from the spirit and scope of the invention as hereinafter claimed.

What is claimed is:

1. An adjustable hanging device, comprising:
 a bearing base including a first housing and a dome member, said dome member having two first inner flat surfaces oppositely facing each other and a first inner cambered surface connecting said two first inner flat surfaces; and
 a first adjusting module including:
  a first sliding member being slidably fitted in said dome member, said first sliding member having two second outer flat surfaces oppositely facing away from each other and a second outer cambered surface connecting said two second outer flat surfaces, wherein said second outer cambered surface corresponds to said first inner cambered surface and said second outer flat surfaces correspond to said first inner flat surfaces, wherein the first housing encloses the dome member and the first sliding member;
  a first gear being pivotably affixed about a center of said first housing so as to be disposed on said first housing and concentrically assembled to said bearing base and said first sliding member, said first gear having two wings, each of said wings respectively having a first curved groove, one of said wings having a plurality of teeth, each of said curved grooves having a first end and a second end, wherein a first radius of curvature defined by a straight line between a center of said first gear and said first end is smaller than a second radius of curvature defined by a straight line between said center of said first gear and said second end;
  a first screw rod being disposed on said first housing and engaging with said teeth of said first gear; and
  a pair of first adjusting columns, each being connected to said first sliding member and elongating through a respective one of said first curved grooves;
 wherein when said first gear is driven by said first screw rod to rotate around said center said first adjusting columns, being restricted within said first curved grooves, are capable of moving relatively with respect to said first gear, and thus make said second outer cambered surface relatively slide with respect to said first inner cambered surface due to the restriction between said first inner flat surfaces and said second outer flat surfaces, so as to drive said first sliding member relatively sliding with respect to said bearing base.

2. The adjustable hanging device of claim 1, further comprising a second adjusting module, the second adjusting module including:
a second sliding member being disposed in said first sliding member, said second sliding member having two third outer flat surfaces oppositely facing away from each other and a third outer cambered surface connecting said third outer flat surfaces;
a second gear that is pivotably affixed about said center of said first gear so as to be concentrically assembled on said first gear, said second gear having two wings, each of said wings respectively having a second curved groove, one of said wings having a plurality of teeth, each of said curved grooves having a third end and a fourth end, wherein a third radius of curvature defined by a straight line between a center of said second gear and said third end is smaller than a fourth radius of curvature defined by a straight line between said center of said second gear and said fourth end;
a second screw rod being disposed on said first housing and engaging with said teeth of said second gear; and
a pair of second adjusting columns, each being connected to said second sliding member and elongating through a respective one of said second curved grooves;
wherein said first sliding member has two second inner flat surfaces oppositely facing each other and a second inner cambered surface connecting said two second inner flat surfaces,
wherein when the second sliding member is accommodated in the first sliding member, the third outer cambered surface is correspondingly disposed on the second inner cambered surface, and when said second gear is driven by said second screw rod to rotate around said center, said second adjusting columns, being restricted within said second curved grooves, are capable of moving relatively with respect to said second gear, and thus make said third outer cambered surface relatively slide with respect to said second inner cambered surface due to the restriction between said second inner flat surfaces and said third outer flat surfaces, so as to drive said second sliding member relatively sliding with respect to said bearing base.

3. The adjustable hanging device of claim 2, further including a bracket, used to attach with an electronic device, said first adjusting module further including a first shaft connected to said first sliding member, and said second adjusting module further including a second shaft connected to said second sliding member,
wherein said bracket is connected to said first shaft and second shaft so that said first sliding member drives said first shaft and simultaneously drives said bracket to relatively move with respect to said bearing base when said first sliding member slides relative to said bearing base,
wherein said second sliding member drives said second shaft and simultaneously drives said bracket to relatively move with respect to said bearing base when said second sliding member slides relative to said bearing base.

4. The adjustable hanging device of claim 3, wherein said bearing base further includes a second housing being connected to said first housing to enclose said first adjusting module and second adjusting module.

5. The adjustable hanging device of claim 4, further comprising a third adjusting module, said third adjusting module including:
a third screw rod being disposed on said second housing;
a sliding block being disposed on said second housing and having a thread portion and a sliding groove, said thread portion engaging with said third screw rod; and
a third adjusting column being disposed on said second housing and penetrating through said sliding groove;
wherein said third screw rod drives said sliding block so that said third adjusting column relatively slides within said sliding groove and drives said first adjusting module and said second adjusting module to concentrically rotate around a center of said bearing base.

6. The adjustable hanging device of claim 5, wherein said first screw rod, said second screw rod and said third screw rod extend to one operational side.

7. The adjustable hanging device of claim 6, wherein said first sliding member slides relative to said bearing base so as to tilt said first shaft at a first angle with respect to said bearing base, said second sliding member slides relative to said bearing base so as to tilt said second shaft at a second angle with respect to said bearing base, and said first adjusting module and second adjusting module rotate at a third angle around said center of said bearing base, wherein said first angle, second angle and third angle are from −5 to 5 degrees.

8. The adjustable hanging device of claim 5, wherein said first housing is formed with a plurality of first holes for said first adjusting columns and second adjusting columns penetrating therethrough.

9. The adjustable hanging device of claim 8, wherein said first holes for said first adjusting columns penetrating therethrough are substantially extending perpendicular to said first screw rod, said first holes for said second adjusting columns penetrating therethrough are substantially extending parallel to said second screw rod, and said sliding groove for said third adjusting column penetrating therethrough are substantially extending perpendicular to third screw rod.

10. The adjustable hanging device of claim 3, wherein said bracket includes a plurality of first bending portions, each of said first bending portions has a second hole for accommodating ends of said first shaft and said second shaft, a plurality of second screws are fastened on said first shaft and second shaft with a gap from said first bending portion respectively, and the diameters of said second holes are larger than the diameters of said first shaft and second shaft.

11. The adjustable hanging device of claim 2, wherein said bearing base is formed with a first fixing hole, said first sliding member is formed with a first through hole, said second sliding member is formed with a second through hole, and a first screw penetrating through said first through hole and said second through hole to screw with said first fixing hole, wherein the diameters of said first through hole and second through hole are larger than the diameter of said first screw.

* * * * *